United States Patent
Idogawa et al.

(10) Patent No.: US 11,313,313 B2
(45) Date of Patent: Apr. 26, 2022

(54) FUEL INJECTION CONTROL APPARATUS

(71) Applicant: TOYOTA JIDOSHA KABUSHIKI KAISHA, Toyota (JP)

(72) Inventors: Masanao Idogawa, Nagoya (JP);
Satoshi Yoshizaki, Gotenba (JP);
Manami Yasunaga, Toyota (JP);
Eiichiroh Kido, Okazaki (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 0 days.

(21) Appl. No.: 17/358,605

(22) Filed: Jun. 25, 2021

(65) Prior Publication Data
US 2022/0049670 A1 Feb. 17, 2022

(30) Foreign Application Priority Data

Aug. 11, 2020 (JP) .............................. JP2020-135935

(51) Int. Cl.
| | | |
|---|---|---|
| *F02D 41/38* | (2006.01) | |
| *F02D 41/32* | (2006.01) | |
| *F02M 51/06* | (2006.01) | |
| *F02M 37/04* | (2006.01) | |

(52) U.S. Cl.
CPC .............. *F02D 41/38* (2013.01); *F02D 41/32* (2013.01); *F02M 37/04* (2013.01); *F02M 51/061* (2013.01); *F02D 2200/0602* (2013.01); *F02D 2200/101* (2013.01)

(58) Field of Classification Search
CPC .. F02D 41/38; F02D 41/32; F02D 2200/0602; F02D 2200/101; F02M 37/04; F02M 51/061
See application file for complete search history.

(56) References Cited

U.S. PATENT DOCUMENTS

| | | | | |
|---|---|---|---|---|
| 5,069,186 A | * | 12/1991 | Illien ...................... | F02M 69/04 123/470 |
| 5,277,156 A | * | 1/1994 | Osuka ................... | F02D 41/123 123/198 DB |
| 6,138,638 A | * | 10/2000 | Morikawa ............. | F02D 41/061 123/295 |
| 6,761,152 B1 | * | 7/2004 | Elmslie .............. | F02M 37/0047 123/463 |

(Continued)

FOREIGN PATENT DOCUMENTS

| | | | | |
|---|---|---|---|---|
| EP | 0501463 A2 | * | 9/1992 | ............ F04B 49/225 |
| JP | 2011256726 A | * | 12/2011 | ......... F02D 41/3094 |
| JP | 2019-178662 A | | 10/2019 | |

*Primary Examiner* — Joseph J Dallo
(74) *Attorney, Agent, or Firm* — Finnegan, Henderson, Farabow, Garrett & Dunner, LLP

(57) ABSTRACT

When a rotational speed of an engine is higher than a predetermined rotational speed, a low-pressure fuel injection valve is controlled through the use of a fuel injection time based on an estimated fuel pressure in a low pressure supply pipe and a target fuel injection amount. When the rotational speed of the engine is equal to or lower than the predetermined rotational speed, the low-pressure fuel injection valve is controlled through the use of a fuel injection time based on a detected fuel pressure input from the fuel pressure sensor from the issuance of a command to activate energization of a solenoid to the start of energization of the solenoid and a target fuel injection amount.

2 Claims, 5 Drawing Sheets

(56) References Cited

U.S. PATENT DOCUMENTS 6,912,983 B2 * 7/2005 Okamoto ............ F02D 41/2464
123/179.16
2015/0285166 A1 * 10/2015 Surnilla ................ F02D 19/084
123/294

* cited by examiner

FUEL INJECTION CONTROL APPARATUS

CROSS-REFERENCE TO RELATED APPLICATION

This application claims priority to Japanese Patent Application No. 2020-135935 filed on Aug. 11, 2020, incorporated herein by reference in its entirety.

BACKGROUND

1. Technical Field

The present disclosure relates to a fuel injection control apparatus, and more specifically, to a fuel injection control apparatus for use in an engine device that is equipped with an engine having a low-pressure fuel injection valve and a high-pressure fuel injection valve, a fuel supply device having a fuel pump and a high-pressure pump, and a fuel pressure sensor.

2. Description of Related Art

Conventionally, as this type of fuel injection control apparatus, there is proposed a fuel injection control apparatus for use in an engine device that is equipped with an engine, a fuel supply device, and a fuel pressure sensor (e.g., see Japanese Unexamined Patent Application Publication No. 2019-178662 (JP 2019-178662 A)). The engine is configured as a V-type multi-cylinder engine, and is equipped with a low-pressure fuel injection valve (a port injection valve) and, a high-pressure fuel injection valve (an in-cylinder injection valve). The fuel supply device is equipped with a fuel pump (a feed pump) that supplies fuel in a fuel tank to a low-pressure supply pipe (a low-pressure fuel pipe arrangement) connected to the low-pressure fuel injection valve, and a high-pressure pump (a high-pressure fuel pump) that force-feeds the fuel in the low-pressure supply pipe to a high-pressure supply pipe connected to the high-pressure fuel injection valve. In this apparatus, a pulsation damper is provided in the high-pressure pump, and restrains the fuel pressure in the low-pressure supply pipe from pulsating.

SUMMARY

In the foregoing fuel injection control apparatus, the pulsation damper is provided in the high-pressure pump. However, with a view to simplifying the configuration of the fuel injection control apparatus, it is desirable to refrain from providing the pulsation damper. However, in the case where the pulsation damper is not provided, the fuel pressure in the low-pressure supply pipe cannot be restrained from pulsating. By the way, in controlling the low-pressure fuel injection valve, the fuel pressure in the low-pressure supply pipe is detected by the fuel pressure sensor, and the low-pressure fuel injection valve is controlled through the use of a fuel injection time based on the detected fuel pressure from the fuel pressure sensor and a target fuel injection amount. When the fuel pressure in the low-pressure supply pipe pulsates, the discrepancy between the fuel pressure detected by the fuel pressure sensor and the fuel pressure in actually injecting fuel may increase. As a result, the fuel injection time cannot be appropriately adjusted, and the discrepancy between the actual fuel injection amount and the target fuel injection amount increases.

It is a main object of a fuel injection control apparatus of the present disclosure to reduce the discrepancy between an actual fuel injection amount and a target fuel injection amount.

The fuel injection control apparatus of the present disclosure has adopted the following means to achieve the foregoing main object.

A fuel injection control apparatus of the present disclosure is equipped with an engine, a fuel supply device, and a fuel pressure sensor. The engine has a low-pressure fuel injection valve and a high-pressure fuel injection valve. The fuel supply device has a fuel pump that supplies fuel in a fuel tank to a low-pressure supply pipe connected to the low-pressure fuel injection valve, and a high-pressure pump that pressurizes the fuel in the low-pressure supply pipe and that supplies the pressurized fuel to a high-pressure supply pipe connected to the high-pressure fuel injection valve. The fuel pressure sensor detects a fuel pressure in the low-pressure supply pipe. The low-pressure fuel injection valve is used for an engine device that is an electromagnetic valve that is opened/closed by activating/deactivating energization of a solenoid. The fuel injection control apparatus controls the low-pressure fuel injection valve and the high-pressure fuel injection valve. The fuel injection control apparatus performs a fuel pressure input process for inputting a detected fuel pressure detected by the fuel pressure sensor at intervals of a predetermined time. The fuel injection control apparatus estimates the fuel pressure in the low-pressure supply pipe at a timing when fuel injection is started from the low-pressure fuel injection valve, based on the detected fuel pressure input in the fuel pressure input process, and controls the low-pressure fuel injection valve through the use of a fuel injection time based on the estimated fuel pressure and a target fuel injection amount, when a rotational speed of the engine is higher than a predetermined rotational speed. The fuel injection control apparatus controls the low-pressure fuel injection valve through the use of the fuel injection time based on the detected fuel pressure input from the fuel pressure sensor from the issuance of a command to activate energization of the solenoid to the start of energization of the solenoid and the target fuel injection amount, when the rotational speed of the engine is equal to or lower than the predetermined rotational speed.

In the fuel injection control apparatus of this present disclosure, the fuel pressure input process for inputting the detected fuel pressure detected by the fuel pressure sensor is performed at intervals of the predetermined time. When the rotational speed of the engine is higher than the predetermined rotational speed, the fuel pressure in the low-pressure supply pipe at the timing when fuel injection from the low-pressure fuel injection valve is started is estimated based on the detected fuel pressure input in the fuel pressure input process, and the low-pressure fuel injection valve is controlled through the use of the fuel injection time based on the estimated fuel pressure and the target fuel injection amount. The fuel pressure input process is performed at intervals of the predetermined time, there may be a discrepancy between the timing when the detected fuel pressure is input in the fuel pressure input process and a start timing when the injection of fuel from the low-pressure fuel injection valve is actually started. When the rotational speed of the engine is higher than the predetermined rotational speed, the pulsation of the fuel pressure in the low-pressure supply pipe generated through the driving of the high-pressure pump can be approximated as a sinusoidal wave, so the fuel pressure in the low-pressure supply pipe at the start timing can be accurately estimated from the detected fuel pressure input in the fuel pressure input process. Accordingly, fuel can be injected from the low-pressure fuel injection valve in the target fuel injection amount or an amount close to the target fuel injection amount, by controlling the low-pressure fuel injection valve through the use of the fuel injection time based on the estimated fuel pressure and the target fuel injection amount. Besides, when the rotational speed of the engine is equal to or lower than the predetermined rotational speed, the low-pressure fuel injection valve is controlled through the use of the fuel injection time based on the detected fuel pressure input from the fuel pressure sensor from the issuance of the command to activate energization of the solenoid to the start of energization of the solenoid, and the target fuel injection amount. When the rotational speed of the engine is equal to or lower than the predetermined rotational speed, the pulsation of the fuel pressure in the low-pressure supply pipe generated through the driving of the high-pressure pump cannot be approximated as a sinusoidal wave. Thus, the fuel pressure in the low-pressure supply pipe at the start timing cannot be accurately estimated from the detected fuel pressure input in the fuel pressure input process. Therefore, fuel can be injected from the low-pressure fuel injection valve in the target fuel injection amount or an amount close to the target fuel injection amount, by controlling the low-pressure fuel injection valve through the use of the fuel injection time based on the detected fuel pressure input from the fuel pressure sensor from the issuance of the command to activate energization of the solenoid to the start of energization of the solenoid and the target fuel injection amount. As a result, the discrepancy between the actual fuel injection amount and the target fuel injection amount can be reduced. It should be noted herein that "the predetermined rotational speed" is a threshold for determining whether or not the pulsation of the fuel pressure in the low-pressure supply pipe generated through the driving of the high-pressure pump can be approximated as a sinusoidal wave.

In this fuel injection control apparatus of the present disclosure, the low-pressure fuel injection valve may be a port injection valve that injects fuel into an intake port of the engine, and the high-pressure fuel injection valve may be an in-cylinder injection valve that injects fuel into a cylinder of the engine.

BRIEF DESCRIPTION OF THE DRAWINGS

Features, advantages, and technical and industrial significance of exemplary embodiments of the present disclosure will be described below with reference to the accompanying drawings, in which like signs denote like elements, and wherein.

DETAILED DESCRIPTION OF EMBODIMENTS

Next, a mode for carrying out the present disclosure will be described through the use of one of the embodiments.

Figure 1:
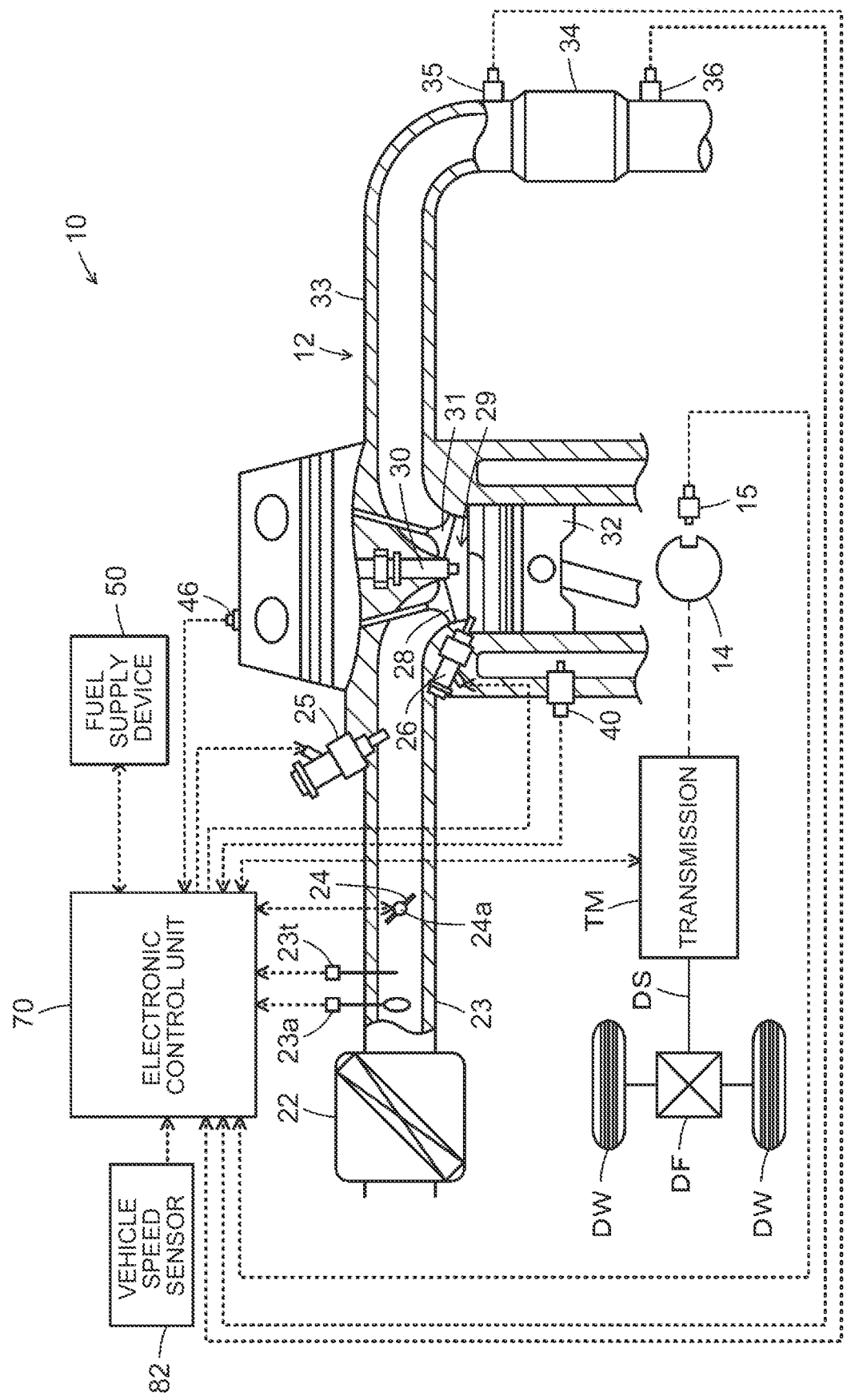
FIG. 1 is a configuration view showing the outline of the configuration of a vehicle 10 that is mounted with a fuel injection control apparatus as one of the embodiments of the present disclosure.

FIG. 1 is a configuration view showing the outline of the configuration of a vehicle 10 that is mounted with a fuel injection control apparatus as one of the embodiments of the present disclosure. As shown in FIG. 1, the vehicle 10 of the embodiment is equipped with an engine 12, a fuel supply device 50, a transmission TM that changes the speed of transmission of motive power from the engine 12 and that transmits the motive power to a drive shaft DS coupled to driving wheels DW via a differential gear DE and an electronic control unit 70. Incidentally, the vehicle 10 may be configured as a hybrid vehicle having a motor as well as the engine 12. The electronic control unit 70 is equivalent to "the fuel injection control apparatus" of the present disclosure.

The engine 12 is configured as, for example, a multi-cylinder internal combustion engine that outputs motive power through the use of a fuel such as gasoline, light fuel or the like. The engine 12 is equipped, in each of cylinders, with a port injection valve 25 that injects fuel into an intake port (into an intake pipe 23), and an in-cylinder injection valve 26 that injects fuel into the cylinder (into a combustion chamber 29). Each of the port injection valve 25 and the in-cylinder injection valve 26 is configured as an electromagnetic valve that has a solenoid (not shown) built therein and that is opened/closed by activating/deactivating energization of the solenoid. By being equipped with the port injection valve 25 and the in-cylinder injection valve 26, the engine 12 can be operated in one of a port injection mode, an in-cylinder injection mode, and a common injection mode.

In the port injection mode, the air cleaned by an air cleaner 22 is sucked into the intake pipe 23 and caused to pass through a throttle valve 24, fuel is injected from the port injection valve 25, and the air and the fuel are mixed with each other. This air-fuel mixture is then sucked into the combustion chamber 29 via an intake valve 28, and is burnt in an explosive manner through the use of electric sparks produced by an ignition plug 30. Reciprocating motion of a piston 32 that is depressed by the energy resulting from explosive combustion is then converted into rotating motion of a crankshaft 14. In the in-cylinder injection mode, air is sucked into the combustion chamber 29 in the same manner as in the port injection mode, fuel is injected from the in-cylinder injection valve 26 during an intake stroke or after the start of a compression stroke, and the air and the fuel are burnt in an explosive manner through the use of electric sparks produced by the ignition plug 30 to obtain rotating motion of the crankshaft 14. In the common injection mode, fuel is injected from the port injection valve 25 in sucking air into the combustion chamber 29, fuel is injected from the in-cylinder injection valve 26 in the intake stroke or the compression stroke, and the air and the fuel are burnt in an explosive manner through the use of electric sparks produced by the ignition plug 30 to obtain rotating motion of the crankshaft 14. A changeover among these injection modes is made in accordance with the operating state of the engine 12. The exhaust gas discharged from the combustion chamber 29 to an exhaust pipe 33 via an exhaust valve 31 is discharged to outside air via an emission control device 34 having an emission control catalyst (a three-way catalyst) that removes harmful components such as carbon monoxide (CO), hydrocarbons (HC), and nitrogen oxides (NOx).

Figure 2:
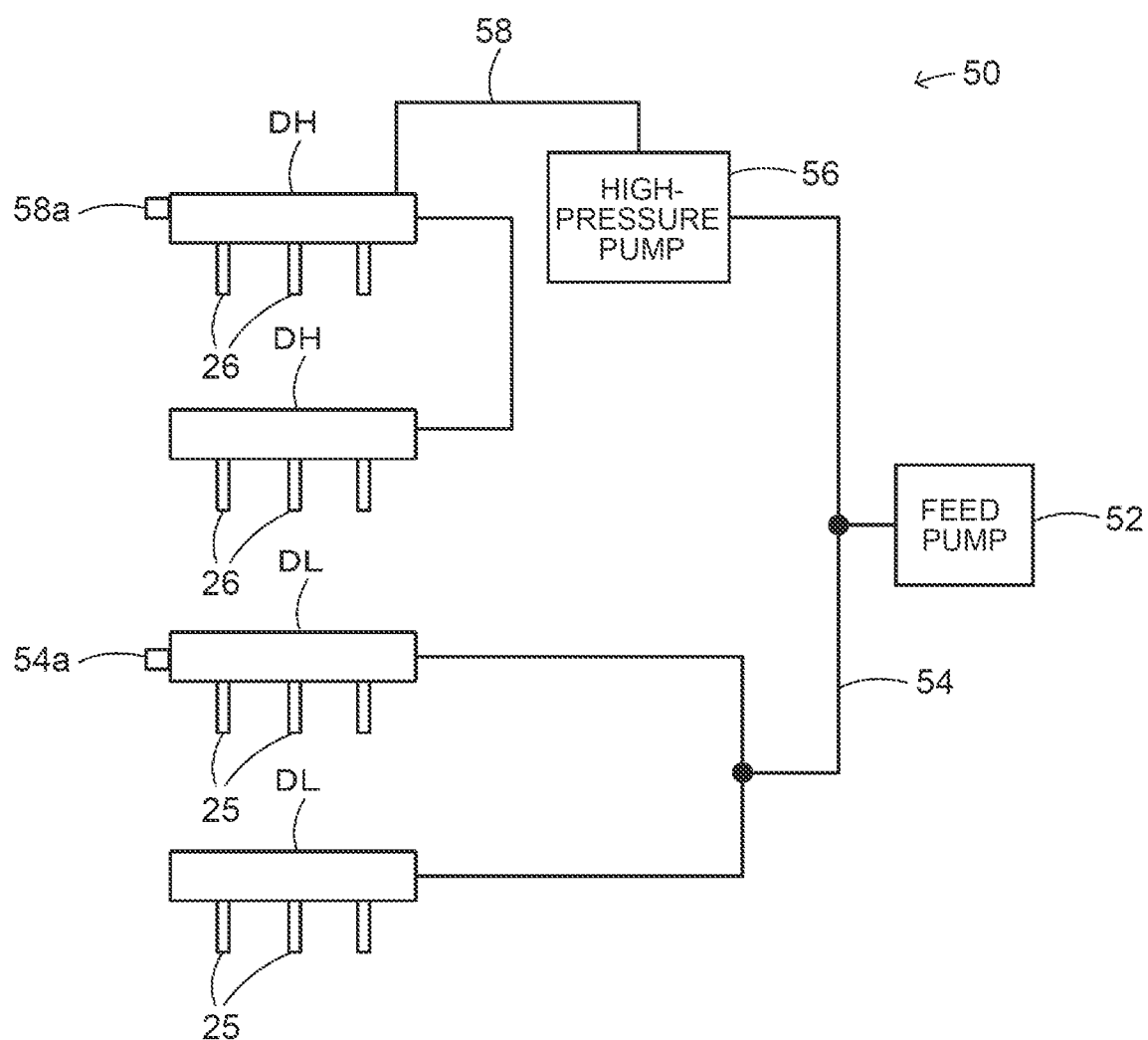
FIG. 2 is a configuration view showing the outline of the configuration of a fuel supply device 50.

FIG. 2 is a configuration view showing the outline of the configuration of the fuel supply device 50. The fuel supply device 50 is configured as a device that supplies the fuel in a fuel tank (not shown) to the port injection valve 25 and the in-cylinder injection valve 26 of the engine 12. The fuel supply device 50 is equipped with a feed pump (a fuel pump) 52, a low-pressure supply pipe 54, a high-pressure pump 56, and a high-pressure supply pipe 58.

The feed pump 52 is configured as an electric pump that operates by being supplied with electric power from a battery (not shown), and is arranged in the fuel tank. The feed pump 52 supplies the fuel in the fuel tank to the low-pressure supply pipe 54.

The low-pressure supply pipe 54 is connected to the port injection valve 25 of each of the cylinders via a low-pressure delivery pipe DL.

The high-pressure pump 56 is configured as a pump that is driven by the motive power from the engine 12 (rotation of an intake camshaft for opening/closing the intake valve 28 in the embodiment), that pressurizes the fuel in the low-pressure supply pipe 54, and that supplies the pressurized fuel to the high-pressure supply pipe 58. The high-pressure pump 56 has an electromagnetic valve that is connected to a suction port of the high-pressure pump 56 and that opens/closes in pressurizing fuel, a check valve that is connected to a discharge port of the high-pressure pump 56, that keeps fuel from flowing backward, and that maintains a fuel pressure in the high-pressure supply pipe 58, and a plunger that operates (moves vertically in FIG. 1) through rotation of the engine 12 (rotation of the intake camshaft). The high-pressure pump 56 sucks the fuel in the low-pressure supply pipe 54 when the electromagnetic valve is opened while the engine 12 is in operation, and intermittently delivers the fuel compressed by the plunger to the high-pressure supply pipe 58 via the check valve and thereby pressurizes the fuel supplied to the high-pressure supply pipe 58 when the electromagnetic valve is closed while the engine 12 is in operation. Incidentally, when the high-pressure pump 56 is driven, the fuel pressure (the pressure of fuel) in the low-pressure supply pipe 54 and the fuel pressure in the high-pressure supply pipe 58 pulsate in accordance with rotation of the engine 12 (rotation of the intake shaft).

The high-pressure supply pipe 58 is connected to the in-cylinder injection valve 26 of each of the cylinders via a high-pressure delivery pipe DH.

The electronic control unit 70 is configured as a microcomputer having a CPU, a ROM, a RAM, a flash memory, and input/output ports.

Signals from various sensors are input to the electronic control unit 70 via the input ports respectively. As the signals input to the electronic control unit 70 and associated with the engine 12, it is possible to mention, for example, a crank angle $\theta cr$ from a crank position sensor 15 that detects a rotational position of the crankshaft 14 of the engine 12, and a coolant temperature Tw from a coolant temperature sensor 40 that detects a temperature of coolant in the engine 12. It is also possible to mention cam angles $\theta ci$ and $\theta co$ from a cam position sensor 44 that detects a rotational position of the intake camshaft for opening/closing the intake valve 28 and a rotational position of an exhaust camshaft for opening/closing the exhaust valve 31. It is also possible to mention a throttle opening degree TH from a throttle position sensor 24a that detects a position of the throttle valve 24, an intake air amount Qa from an airflow meter 23a attached to the intake pipe 23, and an intake air temperature Ta from a temperature sensor 23t attached to the intake pipe 23. It is also possible to mention an air-fuel ratio AF from an air-fuel ratio sensor 35 attached to the exhaust pipe 33 upstream of the emission control device 34, and an oxygen signal O2 from an oxygen sensor 36 attached to the exhaust pipe 33 downstream of the emission control device 34.

As the signals input to the electronic control unit 70 and associated with the fuel supply device 50, it is possible to mention, for example, a rotational speed Nip of the feed pump 52 from a state detection device (not shown) attached to the feed pump 52, and an operating current Ilp and an operating voltage Vlp that are supplied to the feed pump 52 from a battery (not shown). It is also possible to mention a fuel amount Qftnk from a fuel amount sensor 51a that detects an amount of fuel in the fuel tank 51, a low-pressure fuel pressure (a pressure of fuel in the low-pressure supply pipe 54) Pflo from a fuel pressure sensor 54a attached to the low-pressure supply pipe 54 in the vicinity of the port injection valve 25 (e.g., to the low-pressure delivery pipe DL), and a high-pressure fuel pressure (a pressure of fuel in the high-pressure supply pipe 58) Pfhi from a fuel pressure sensor 58a attached to the high-pressure supply pipe 58 in the vicinity of the in-cylinder injection valve 26 (e.g., to the high-pressure delivery pipe DH).

As the other signals input to the electronic control unit 70, it is possible to mention, for example, a signal from the transmission TM, and a vehicle speed V from a vehicle speed sensor 82. It is also possible to mention an ignition signal IG from an ignition switch, a shift position SP from a shift position sensor that detects an operation position of a shift lever, an accelerator depression amount Acc from an accelerator position sensor that detects a depression amount of an accelerator pedal, and a brake position BP from a brake position sensor that detects a depression amount of a brake pedal, although none of these signals is shown in the drawing.

Various control signals are output from the electronic control unit 70 via the output ports respectively. As the signals output from the electronic control unit 70, it is possible to mention, for example, a control signal to the throttle valve 24 of the engine 12, a control signal to the port injection valve 25, a control signal to the in-cylinder injection valve 26, and a control signal to the ignition plug 30. It is possible to mention a control signal to the feed pump 52 of the fuel supply device 50, and a control signal to the electromagnetic valve of the high-pressure pump 57. It is also possible to mention a control signal to the transmission TM.

The electronic control unit 70 computes the rotational speed Ne, a load factor KL, and a torque Te of the engine 12. The rotational speed Ne of the engine 12 is computed based on the crank angle θcr from the crank position sensor 15. The load factor KL of the engine 12 is a ratio of a volume of air actually sucked per cycle to a cylinder capacity of the engine 12 per cycle, and is computed based on the intake air amount Qa from the airflow meter 23a and the rotational speed Ne of the engine 12. The torque Te of the engine 12 is computed (estimated) based on the throttle opening degree TH from the throttle position sensor 24a.

In the vehicle 10 of the embodiment thus configured, the CPU of the electronic control unit 70 performs intake air amount control, fuel injection control, and ignition control of the engine 12 when the engine 12 is in operation.

Intake air amount control of the engine 12 is performed by, for example, setting a target intake air amount Qa* based on a target load factor KL* of the engine 12 based on the accelerator depression amount Acc and the vehicle speed V, setting a target throttle opening degree TH* such that the intake air amount Qa becomes equal to the target intake air amount Qa*, and controlling the throttle valve 24 through the use of the target throttle opening degree TH*. Fuel injection control is performed by setting an execution injection mode from the port injection mode, the in-cylinder injection mode, and the common injection mode based on the rotational speed Ne and the load factor KL of the engine 12, setting target injection amounts (target fuel injection amounts) Qfp* and Qfd* of the port injection valve 25 and the in-cylinder injection valve 26 such that the air-fuel ratio AF becomes equal to a target air-fuel ratio AF* (e.g., a theoretical air-fuel ratio), based on the intake air amount Qa and the execution injection mode, and controlling the port injection valve 25 and the in-cylinder injection valve 26 through the use of the target injection amounts Qfp* and Qfd* respectively. Ignition control is performed by setting a target ignition timing Ti* based on the rotational speed Ne and the target load factor KL* of the engine 12, and controlling the ignition plug 30 through the use of the set target ignition timing Ti*.

Figure 3:
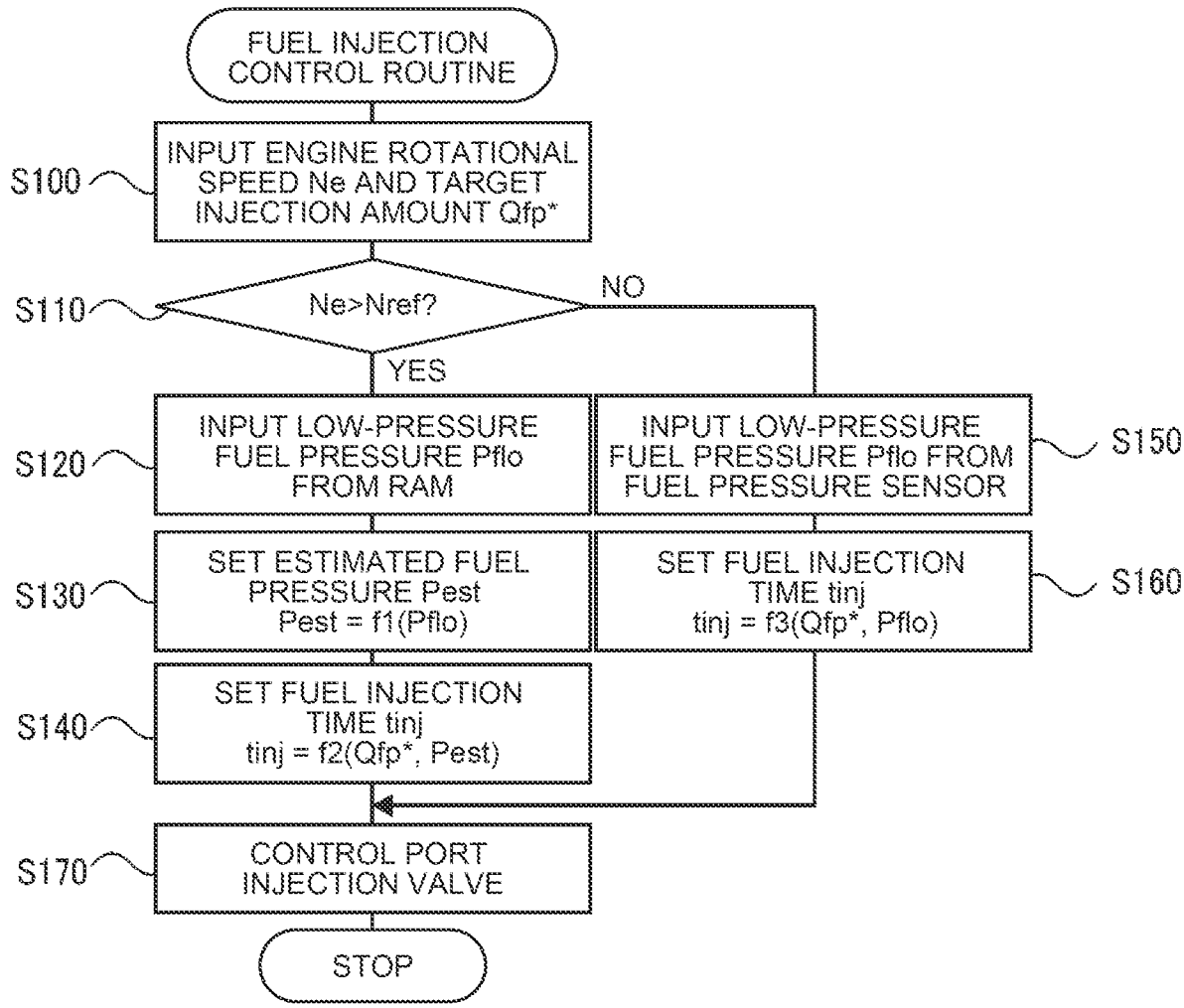
FIG. 3 is a flowchart showing an example of a fuel injection control routine that is executed by an electronic control unit 70 for a port injection valve 25 at the time of a common injection mode.

Next, the operation of the vehicle 10 that is equipped with the fuel injection control apparatus of the embodiment thus configured, especially fuel injection control for the port injection valve 25 in the case where the common injection mode is set as the execution injection mode will be described. FIG. 3 is a flowchart showing an example of a fuel injection control routine that is executed by the electronic control unit 70 for the port injection valve 25 at the time of the common injection mode. The present routine is executed when a command to activate energization of the solenoid of the port injection valve 25 is issued (when an injection start command for starting fuel injection from the port injection valve 25 is issued). The command to activate energization is issued at a timing when the crank angle θcr from the crank position sensor 15 is smaller than a predetermined angle (e.g., 25°, 30°, or 35°) from a start angle determined in advance as an angle for starting fuel injection.

When the present routine is executed, the CPU of the electronic control unit 70 performs a process of inputting the rotational speed (the engine rotational speed) Ne of the engine 12 and the target injection amount Qfp* of the engine 12 thereto (step S100). As the rotational speed Ne, a value computed based on the crank angle θcr from the crank position sensor 15 is input to the electronic control unit 70. As the target injection amount Qfp*, a value set in the foregoing process in the case where the common injection mode is set as the execution injection mode is input to the electronic control unit 70.

Subsequently, the electronic control unit 70 determines whether or not the rotational speed Ne of the engine 12 is higher than a predetermined rotational speed. Nref (step S110). The predetermined rotational speed Nref is a threshold for determining whether or not the waveform of the pulsation of the fuel pressure generated in the low-pressure supply pipe 54 in driving the high-pressure pump 56 can be approximated as a sinusoidal wave.

When the rotational speed Ne of the engine 12 is higher than the predetermined rotational speed Nref, the electronic control unit 70 determines that the waveform of the pulsation of the fuel pressure generated in the low-pressure supply pipe 54 in driving the high-pressure pump 56 can be approximated as a sinusoidal wave, and inputs a low-pressure fuel pressure (a detected fuel pressure) Pflo stored in the RAM thereto (step S120). A process of saving the low-pressure fuel pressure Pflo in the RAM will now be described.

Figure 4:
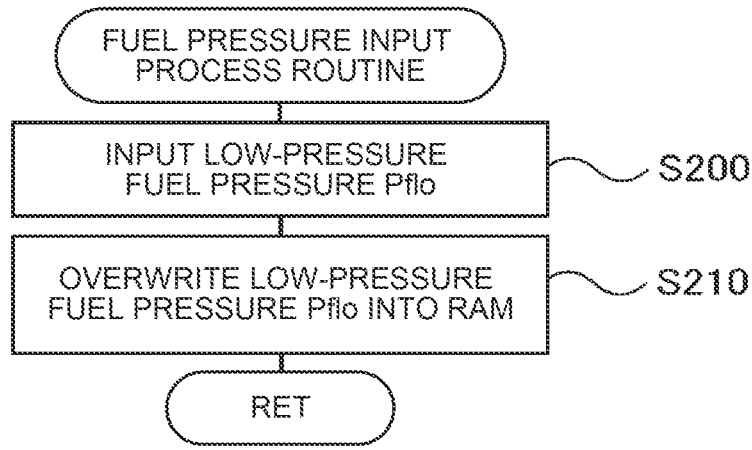
FIG. 4 is a flowchart showing an example of a fuel pressure input process routine that is executed by the electronic control unit 70.

FIG. 4 is a flowchart showing an example of a fuel pressure input process routine that is executed by the electronic control unit 70. The fuel pressure input process routine is repeatedly executed at intervals of a predetermined time (e.g., four milliseconds) regardless of the fuel injection control routine.

When the fuel pressure input process routine is executed, the CPU of the electronic control unit 70 performs a process of inputting the low-pressure fuel pressure Pflo thereto (step S200). As the low-pressure fuel pressure Pflo, a detected value detected by the fuel pressure sensor 54a is input.

When the low-pressure fuel pressure Pflo is input to the electronic control unit 70, the electronic control unit 70 overwrites and saves the input low-pressure fuel pressure Pflo in the RAM (step S210), and ends the fuel pressure input process routine. Accordingly, the latest low-pressure fuel pressure Pflo detected by the fuel pressure sensor 54a is stored in the RAM. Step S120 is the process of inputting the low-pressure fuel pressure Pflo input from the fuel pressure sensor 54a in the fuel pressure input process routine.

When the low-pressure fuel pressure Pflo is input to the electronic control unit 70 in Step S120, the electronic control unit 70 sets an estimated fuel pressure Pest as an estimated value of the fuel pressure in the low-pressure supply pipe 54 at a timing when fuel injection from the port injection valve 25 to the intake port is started through the use of the input low-pressure fuel pressure Pflo (a timing when energization of the solenoid of the port injection valve 25 is started) (step S130).

Figure 5:
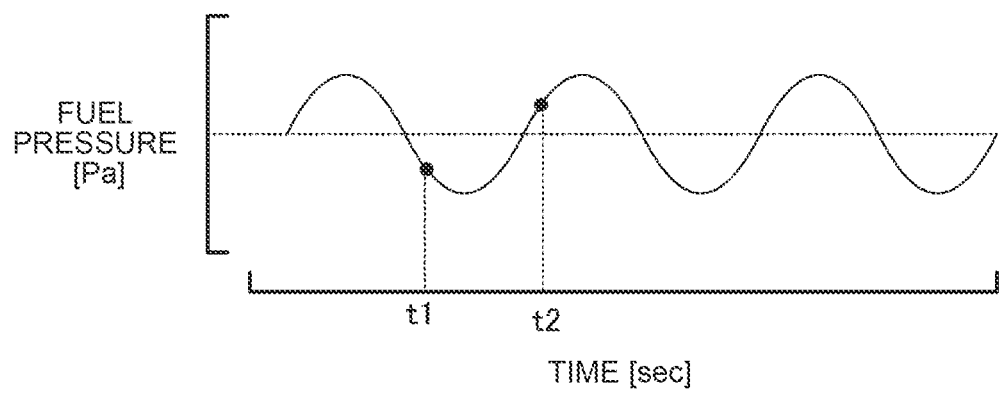
FIG. 5 is an illustrative view for illustrating the pulsation of a fuel pressure in a low-pressure supply pipe 54 at the time when a rotational speed Ne of an engine 12 is higher than a predetermined rotational speed Nref.

FIG. 5 is an illustrative view for illustrating the pulsation of the fuel pressure in the low-pressure supply pipe 54 at the time when the rotational speed Ne of the engine 12 is higher than the predetermined rotational speed Nref. In FIG. 5, a timing t1 is a timing when the low-pressure fuel pressure Pflo is input in step S200 of FIG. 4. A timing t2 is a timing when fuel injection from the port injection valve 25 is actually started. As shown in FIG. 5, there is a certain length of time between the timing when the low-pressure fuel pressure Pflo is input in step S200 of FIG. 4 and the timing when fuel injection from the port injection valve 25 is actually started. Since the fuel pressure in the low-pressure supply pipe 54 pulsates, there is a discrepancy between the low-pressure fuel pressure Pflo input in step S200 and the actual fuel pressure at the timing when fuel injection from the port injection valve 25 is started. By the way, the inventor has found out that the waveform of the pulsation of the fuel pressure in the low-pressure supply pipe 54 can be approximated as a sinusoidal wave when the rotational speed Ne of the engine 12 is higher than the predetermined rotational speed Nref. Accordingly, the estimated fuel pressure Pest as the estimated value of the fuel pressure at the timing when fuel injection from the port injection valve 25 is started (the timing t2) can be accurately set from the low-pressure fuel pressure Pflo input in step S200, namely, the low-pressure fuel pressure Pflo input in step S120 the timing when the low-pressure fuel pressure Pflo is input in step S200 of FIG. 4 (the timing t1), the timing when fuel injection from the port injection valve 25 is actually started (the timing t2), and the predetermined waveform (the wafeform of the sinusoidal wave) of the fuel pressure in the low-pressure supply pipe 54.

When the estimated fuel pressure Pest is thus set, the electronic control unit 70 sets a fuel injection time tinj from the estimated fuel pressure Pset and a target injection amount Qfp* (step S140), controls the port injection valve 25 such that fuel is injected to the intake port by keeping energization of the solenoid of the port injection valve 25 activated for the fuel injection time tinj (step S170), and ends the fuel injection control routine. In this manner, fuel can be injected from the port injection valve 25 in the target injection amount Qfp* or an amount close to the target injection amount Qfp*, by controlling the port injection valve 25 through the use of the fuel injection time tinj based on the estimated fuel pressure Pest and the target injection amount Qfp*. In consequence, the discrepancy between the actual amount of fuel injection from the port injection valve 25 and the target injection amount Qfp* can be reduced.

When the rotational speed Ne of the engine 12 is equal to or lower than the predetermined rotational speed Nref in step S110, the electronic control unit 70 determines that the waveform of the pulsation of the fuel pressure in the low-pressure supply pipe 54 generated in driving the high-pressure pump 56 cannot be approximated as a sinusoidal wave, inputs the low-pressure fuel pressure Pflo detected by the fuel pressure sensor 54a thereto (step S150), sets the fuel injection time tinj from the input low-pressure fuel pressure Pflo and the target injection amount Qfp* (step S160), controls the port injection valve 25 such that fuel is injected to the intake port by keeping energization of the solenoid of the port injection valve 25 activated for the fuel injection time tinj (step S170), and ends the fuel injection control routine. Step S150 is carried out between the issuance of a command to activate energization of the solenoid of the port injection valve 25 and the start of energization of the solenoid. Accordingly, the low-pressure fuel pressure Pflo in step S150 is a detected value detected by the fuel pressure sensor 54a between the issuance of the command to activate the solenoid of the port injection valve 25 and the start of energization of the solenoid.

Figure 6:
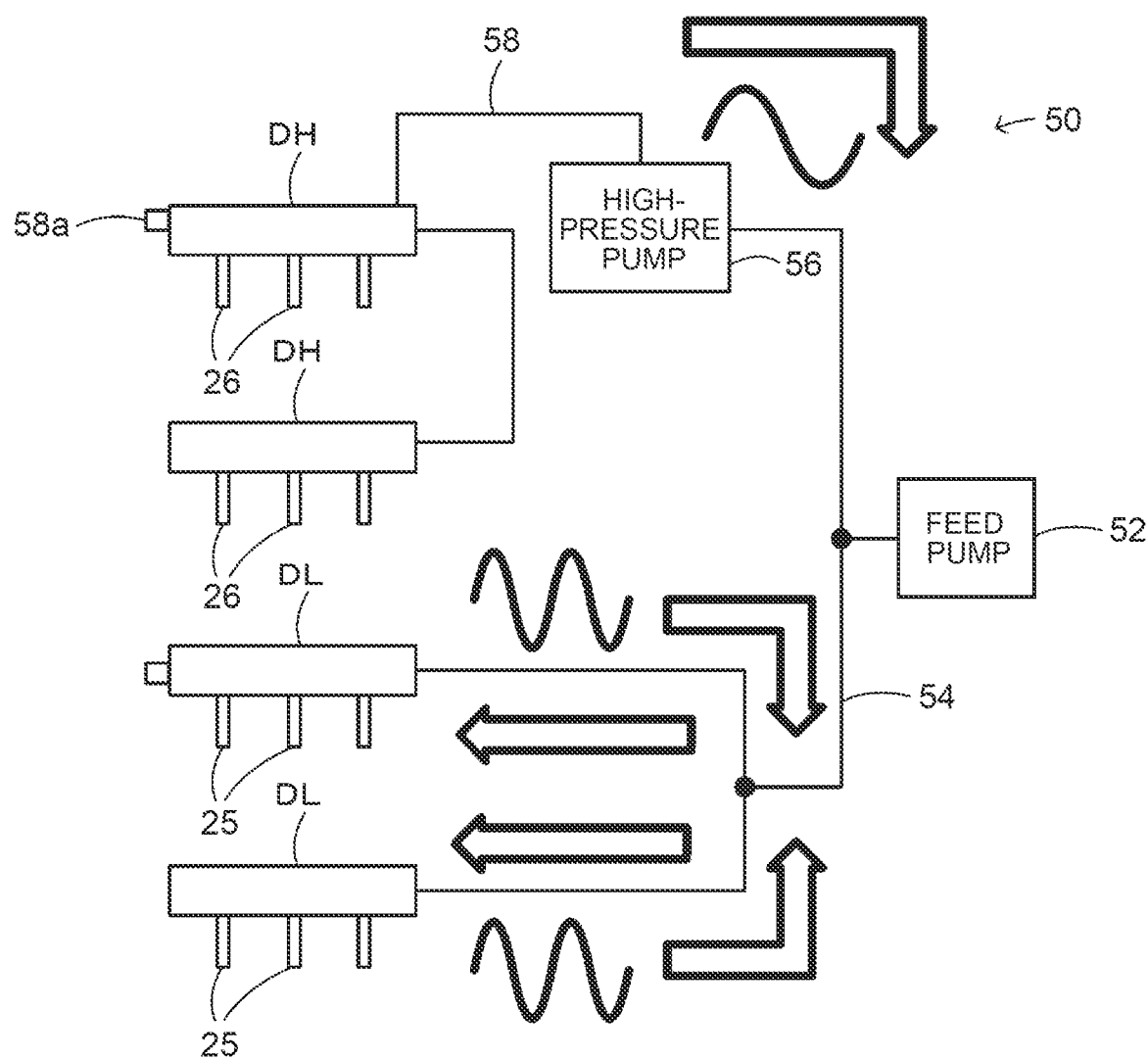
FIG. 6 is a schematic view schematically representing how the pulsation of a fuel pressure generated in a high-pressure pump 56 is transmitted to the interior of the low-pressure supply pipe 54 when the rotational speed Ne of the engine 12 is equal to or lower than the predetermined rotational speed Nref.

The reason why the low-pressure fuel pressure Pflo input in the fuel pressure input process routine exemplified in FIG. 4 is not used in steps S150 and S160 will now be described. FIG. 6 is a schematic view schematically representing how the pulsation of the fuel pressure generated in the high-pressure pump 56 is transmitted to the interior of the low-pressure supply pipe 54 when the rotational speed Ne of the engine 12 is equal to or lower than the predetermined rotational speed Nref. Each of thick undulating lines indicates the waveform of the pulsation of the fuel pressure transmitted to the interior of the low-pressure supply pipe 54. Each of thick arrows indicates the direction in which the pulsation of the fuel pressure generated in the high-pressure pump 56 is transmitted to the interior of the low-pressure supply pipe 54. When the rotational speed Ne of the engine 12 is equal to or lower than the predetermined rotational speed Nref, the waveform of the pulsation of the fuel pressure in the low-pressure supply pipe 54 is a waveform obtained by synthesizing the waveform of the pulsation of the fuel pressure in the low-pressure supply pipe 54 resulting from the transmission of the pulsation of the fuel pressure generated in the high-pressure pump 56 to the interior of the low-pressure supply pipe 54 and the waveform of the pulsation of the fuel pressure generated in the high-pressure pump 56 upon returning to the high-pressure pump 56 side after being transmitted to the interior of the low-pressure supply pipe 54 and being reflected by the low-pressure delivery pipe DL.

Figure 7:
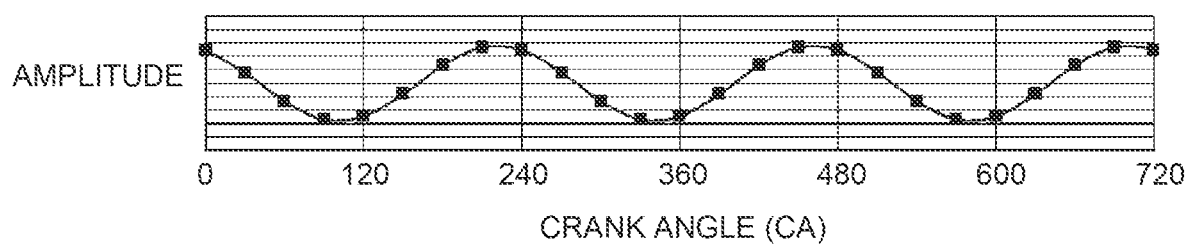
FIG. 7 is an illustrative view showing the outline of a waveform of the pulsation of the fuel pressure in the low-pressure supply pipe 54 resulting from the transmission of the pulsation of the fuel pressure generated in the high-pressure pump 56 to the interior of the low-pressure supply pipe 54.
Figure 8:
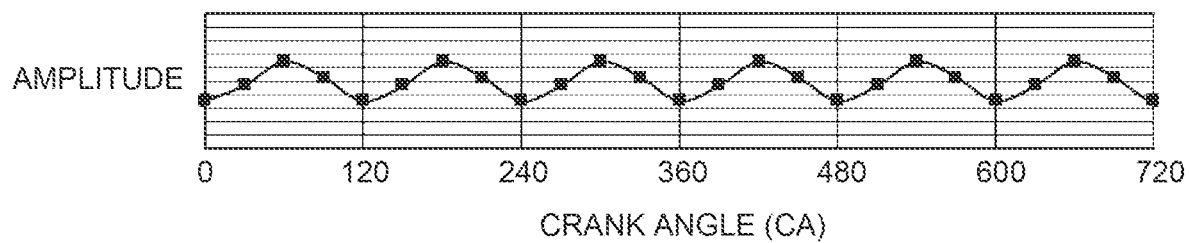
FIG. 8 is an illustrative view showing the outline of a waveform of the pulsation of the fuel pressure generated in the high-pressure pump 56, transmitted to the interior of the low-pressure supply pipe 54, reflected by a low-pressure delivery pipe DL, and returning to the high-pressure pump 56 side.
Figure 9:
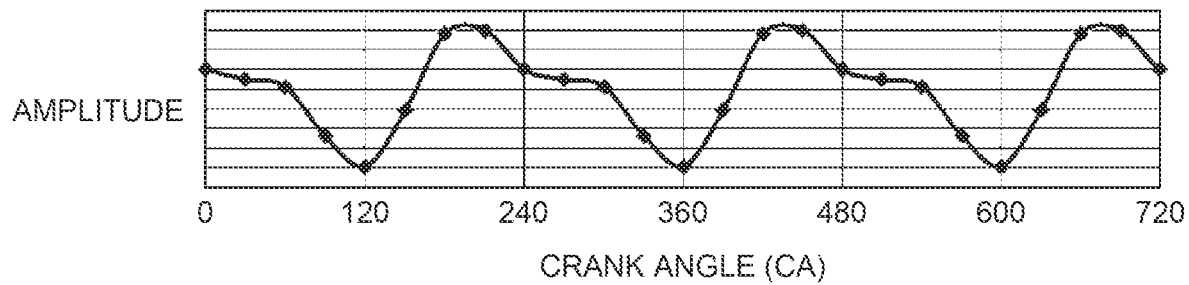
FIG. 9 shows a waveform of a synthetic wave obtained by synthesizing a wave of FIG. 7 and a wave of FIG. 8 with each other.

FIG. 7 is an illustrative view showing the outline of the waveform of the pulsation of the fuel pressure in the low-pressure supply pipe 54 resulting from the transmission of the pulsation of the fuel pressure generated in the high-pressure pump 56 to the interior of the low-pressure supply pipe 54. FIG. 8 is an illustrative view showing the outline of the waveform of the pulsation of the fuel pressure generated in the high-pressure pump 56 upon returning to the high-pressure pump 56 side after being transmitted to the interior of the low-pressure supply pipe 54 and being reflected by the low-pressure delivery pipe DL. FIG. 9 shows the waveform of a synthetic wave obtained by synthesizing the wave of FIG. 7 and the wave of FIG. 8 with each other. As shown in FIG. 9, the synthetic wave cannot be approximated as a sinusoidal wave. Therefore, the fuel pressure at the start timing cannot be accurately estimated from the low-pressure fuel pressure Pflo input in the fuel pressure input process routine exemplified in FIG. 4, or the time required for computation increases due to the necessity to perform complicated computation for estimation.

In view of these circumstances, the low-pressure fuel pressure Pflo in step S150 is a detected value detected by the fuel pressure sensor 54a between the issuance of a command to activate energization of the solenoid of the port injection valve 25 and the start of energization of the solenoid. In this manner, the discrepancy between the low-pressure fuel pressure Pflo in step S150 and the fuel pressure in the low-pressure supply pipe 54 at the start timing can be reduced. Accordingly, the fuel injection time tinj can be appropriately set, and fuel can be injected from the port injection valve 25 in the target injection amount Qfp* or an amount close to the target injection amount Qfp*. Thus, the discrepancy between the actual fuel injection amount and the target injection amount Qfp* can be reduced.

With the vehicle 10 that is equipped with the fuel injection control apparatus of the embodiment described above, the discrepancy between the actual fuel injection amount and the target injection amount Qfp* can be reduced by executing the fuel pressure input process routine for inputting the low-pressure fuel pressure Pflo detected by the fuel pressure sensor 54a at intervals of a predetermined time, estimating the fuel pressure in the low-pressure supply pipe 54 at the timing when fuel injection from the port injection valve 25 is started, based on the low-pressure fuel pressure Pflo input in the fuel pressure input process routine, when the rotational speed Ne of the engine 12 is higher than the predetermined rotational speed Nref, controlling the port injection valve 25 through the use of the fuel injection time tinj based on the estimated fuel pressure (the estimated fuel pressure Pest) and the target injection amount Qfp*, and controlling the port injection valve 25 through the use of the fuel injection time tinj based on the low-pressure fuel pressure Pflo input from the fuel pressure sensor 54a between the issuance of a command to activate energization of the solenoid and the start of energization of the solenoid, and the target injection amount Qfp*, when the rotational speed Ne of the engine 12 is equal to or lower than the predetermined rotational speed Nref.

In the vehicle 10 that is equipped with the fuel injection control apparatus of the embodiment, the engine 12 is equipped with the port injection valve 25 and the in-cylinder injection valve 26. However, it is sufficient for the engine 12 to be equipped with two kinds of fuel injection valves (a low-pressure fuel injection valve and a high-pressure fuel injection valve) to which fuel at different pressures is supplied respectively.

In the embodiment, the case where the fuel injection control apparatus of the present disclosure is applied to the vehicle has been exemplified. However, the fuel injection control apparatus of the present disclosure may be applied to any type of engine device that is equipped with an engine having a low-pressure fuel injection valve and a high-pressure fuel injection valve, a fuel supply device having a fuel pump and a high-pressure pump, and a fuel pressure sensor.

A corresponding relationship between the main elements of the embodiment and the main elements of the present disclosure mentioned in the section of means for solving the problem will be described. In the embodiment, the electronic control unit 70 is equivalent to "the fuel injection control apparatus".

Incidentally, the corresponding relationship between the main elements of the embodiment and the main elements of the present disclosure mentioned in the section of means for solving the problem is an example for concretely illustrating the mode for carrying out the present disclosure mentioned in the section of means for solving the problem, and hence is not intended to limit the elements of the present disclosure mentioned in the section of means for solving the problem. That is, the present disclosure mentioned in the section of means for solving the problem should be interpreted based on what is described in the section, and the embodiment is nothing more than a concrete example of the present disclosure mentioned in the section of means for solving the problem.

The mode for carrying out the present disclosure has been described above using the embodiment. However, it is obvious that the applicable embodiment is not limited at all to this embodiment but can be carried out in various modes within such a range as not to depart from the gist of the present disclosure.

The present disclosure can be utilized in industries for manufacturing fuel injection control apparatuses, and the like.

What is claimed is:

1. A fuel injection control apparatus comprising:
an engine having a low-pressure fuel injection valve and a high-pressure fuel injection valve;
a fuel supply device having a fuel pump that supplies fuel in a fuel tank to a low-pressure supply pipe connected to the low-pressure fuel injection valve, and a high-pressure pump that pressurizes the fuel in the low-pressure supply pipe and that supplies the pressurized fuel to a high-pressure fuel supply pipe connected to the high-pressure fuel injection valve; and
a fuel pressure sensor that detects a fuel pressure in the low-pressure supply pipe, wherein
the low-pressure fuel injection valve is used for an engine device that is an electromagnetic valve that is opened and closed by activating and deactivating energization of a solenoid,
the fuel injection control apparatus controlling the low-pressure fuel injection valve and the high-pressure fuel injection valve,
the fuel injection control apparatus performing a fuel pressure input process for inputting a detected fuel pressure detected by the fuel pressure sensor at intervals of a predetermined time,
the fuel injection control apparatus estimating the fuel pressure in the low-pressure supply pipe at a timing when fuel injection is started from the low-pressure fuel injection valve, based on the detected fuel pressure input in the fuel pressure input process, and controlling the low-pressure fuel injection valve through use of a fuel injection time based on the estimated fuel pressure and a target fuel injection amount, when a rotational speed of the engine is higher than a predetermined rotational speed, and
the fuel injection control apparatus controlling the low-pressure fuel injection valve through use of the fuel injection time based on the detected fuel pressure input from the fuel pressure sensor from issuance of a command to activate energization of the solenoid to start of energization of the solenoid and the target fuel injection amount, when the rotational speed of the engine is equal to or lower than the predetermined rotational speed.

2. The fuel injection control apparatus according to claim 1, wherein
the low-pressure fuel injection valve is a port injection valve that injects fuel into an intake port of the engine, and
the high-pressure fuel injection valve is an in-cylinder injection valve that injects fuel into a cylinder of the engine.

* * * * *